(12) United States Patent
Kaltenbach et al.

(10) Patent No.: US 11,485,219 B2
(45) Date of Patent: Nov. 1, 2022

(54) TRANSMISSION AND DRIVE SYSTEM OF A MOTOR VEHICLE

(71) Applicant: ZF Friedrichshafen AG, Friedrichshafen (DE)

(72) Inventors: Johannes Kaltenbach, Friedrichshafen (DE); Matthias Horn, Tettnang (DE); Uwe Griesmeier, Markdorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/286,395

(22) PCT Filed: Sep. 17, 2019

(86) PCT No.: PCT/EP2019/074795
§ 371 (c)(1),
(2) Date: Apr. 16, 2021

(87) PCT Pub. No.: WO2020/078640
PCT Pub. Date: Apr. 23, 2020

(65) Prior Publication Data
US 2021/0354550 A1    Nov. 18, 2021

(30) Foreign Application Priority Data
Oct. 18, 2018    (DE) ...................... 10 2018 217 827.5

(51) Int. Cl.
*B60K 6/387*    (2007.10)
*B60K 6/48*    (2007.10)
(Continued)

(52) U.S. Cl.
CPC ................ *B60K 6/48* (2013.01); *B60K 6/387* (2013.01); *B60K 6/547* (2013.01); *F16H 3/006* (2013.01);
(Continued)

(58) Field of Classification Search
CPC .......... B60K 6/48; B60K 6/387; B60K 6/547; B60K 2006/4825; B60K 2006/4833; F16H 3/006; F16H 3/725
See application file for complete search history.

(56) References Cited

U.S. PATENT DOCUMENTS 8,075,436 B2 * 12/2011 Bachmann ...... B60W 30/18027
475/5
9,254,737 B2 * 2/2016 Kaltenbach ............ B60K 6/365
(Continued)

FOREIGN PATENT DOCUMENTS

DE    102011089712 A1    6/2013
WO    WO 2015014555 A1    2/2015

OTHER PUBLICATIONS

International Search Report (English Translation) PCT/EP2019/074795, dated Dec. 5, 2019. (2 pages).

*Primary Examiner* — Tinh Dang
(74) *Attorney, Agent, or Firm* — Dority & Manning, P.A.

(57) ABSTRACT

A transmission (2) of a motor vehicle includes a first input shaft (7) for a first prime mover (3), a second input shaft (8) for a second prime mover (4), and an output shaft (9). A first sub-transmission (5) includes the first input shaft and a countershaft (11) coupled to the first input shaft (7) via a constant ratio. Gearwheels (16, 17, 18) are arranged on the countershaft, which mesh exclusively into gearwheels (12, 13, 15) arranged coaxially to the first input shaft (7). At least some of these gearwheels mesh into gearwheels (20, 21) arranged on the output shaft (9). Shift elements (A, B, C, D) are associated with the first input shaft (7) as well as with the countershaft (11), which provide either a gear with a first number of instances of gearwheel meshing or a winding-path gear with a second number of instances of gearwheel meshing. A second sub-transmission (6) includes the second input shaft (8), which is designed as a planetary transmis-
(Continued)

sion. A ring gear (22) forms the second input shaft (8), and a carrier (23) is coupled to the output shaft (9) via a gearwheel (14) arranged coaxially to the first input shaft (7). Shift elements (F, E) are associated with the planetary transmission, via which a sun gear (24) is fixedly connectable to the housing or the planetary transmission is bringable into direct drive. A sub-transmission coupling of the sub-transmissions is providable via one of the shift elements (A) associated with the countershaft.

11 Claims, 10 Drawing Sheets

(51) Int. Cl.
  *B60K 6/547* (2007.10)
  *F16H 3/00* (2006.01)
  *F16H 3/72* (2006.01)
(52) U.S. Cl.
  CPC ...... *F16H 3/725* (2013.01); *B60K 2006/4825* (2013.01); *B60K 2006/4833* (2013.01)

(56) References Cited

U.S. PATENT DOCUMENTS

| | | |
|---|---|---|
| 10,655,710 B2 * | 5/2020 | Rekow .................. B60W 30/19 |
| 2016/0176280 A1 | 6/2016 | Kaltenbach et al. |
| 2017/0129323 A1 | 5/2017 | Fremau et al. |

* cited by examiner

Shift Conditions with Exemplary Ratio Values

| Condition | Gear ICE | i_ICE | phi ICE | Gear EM1 | i_EM1 | A | B | C | D | E | F | Note |
|---|---|---|---|---|---|---|---|---|---|---|---|---|
| 1 | 1 | 8.63 | 1.58 | 1 | 8.63 | x | | | | x | | Hybrid Mode |
| 2 | 2 | 5.46 | 1.49 | 1 | 8.63 | | x | | | x | | Hybrid Mode |
| 3 | 3 | 3.68 | 1.40 | 1 | 8.63 | | | x | | x | | Hybrid Mode |
| 4 | 4 | 2.63 | | 1 | 8.63 | | | | | x | | Hybrid Mode |
| 5 | 2 | 5.46 | | 2 | 5.46 | | x | | x | | x | Hybrid Mode |
| 6 | 3 | 3.68 | | 2 | 5.46 | | | x | | | x | Hybrid Mode |
| 7 | 4 | 2.63 | | 2 | 5.46 | | | | x | | x | Hybrid Mode |
| 8 | 3 | 3.68 | | 3 | 3.68 | x | | x | | | | Hybrid Mode |
| 9 | 4 | 2.63 | | 4 | 2.63 | x | | | x | | | Hybrid Mode |
| 10 | 0 | | | 1 | 8.63 | | | | | | | Purely Electric |
| 11 | 0 | | | 2 | 5.46 | | x | | | x | x | Purely Electric |
| 12 | 0 | | | 0 | | x | | | | | | Charge in Neutral |
| 13 | 2 | 5.46 | | 0 | | | | x | | | | Purely Internal Combustion Engine-driven |
| 14 | 3 | 3.68 | | 0 | | | | | | | | Purely Internal Combustion Engine-driven |
| 15 | 4 | 2.63 | | 0 | | | | | x | | | Purely Internal Combustion Engine-driven |

Gear 0 Means Neutral

Exemplary Ratio Values

| Gear Stage | i | Effective Direction |
|---|---|---|
| i_ab | 3.50 | Output Shaft to Differential |
| i0 | -1.72 | Stationary Transmission Ratio Planetary Gear Set |
| i1 | 0.95 | Countershaft to Ring Gear |
| i2 | 1.56 | Input Shaft to Output Shaft |
| i3 | 1.33 | Countershaft to Input Shaft |
| i4 | 0.75 | Input Shaft to Output Shaft |
| ic | 1.05 | Input Shaft to Countershaft |

Fig. 2

TRANSMISSION AND DRIVE SYSTEM OF A MOTOR VEHICLE

CROSS-REFERENCE TO RELATED APPLICATIONS

The present application is related and has right of priority to German Patent Application No. 102018217827.5 filed in the German Patent Office on Oct. 18, 2018 and is a nationalization of PCT/EP2019/074795 filed in the European Patent Office on Sep. 17, 2019, both of which are incorporated by reference in their entirety for all purposes.

FIELD OF THE INVENTION

The invention relates generally to a transmission of a motor vehicle. In addition, the invention relates generally to a transmission system of a motor vehicle.

BACKGROUND

US 2017/0129323 A1 describes a transmission of a motor vehicle designed as a hybrid vehicle. The transmission includes a first input shaft, to which a first prime mover is coupleable, and a second input shaft, to which a second prime mover is coupleable. Moreover, the transmission includes an output shaft, to which a drive output is coupleable. The first input shaft is an integral part of a first sub-transmission for the first prime mover. The second input shaft is an integral part of a second sub-transmission for the second prime mover. Both sub-transmissions are designed as a spur gear drive according to US 2017/0129323 A1. The two sub-transmissions are coupleable to one another and, in fact, via a shift element arranged on a countershaft.

The transmission according to US 2017/0129323 A1 needs a relatively large installation space and has a relatively high weight.

BRIEF SUMMARY OF THE INVENTION

On the basis thereof, example aspects of the invention i provide a new type of transmission of a motor vehicle and a transmission system with a transmission of this type.

The transmission includes a first input shaft for a first prime mover.

In addition, the transmission includes a second input shaft for a second prime mover.

Moreover, the transmission includes an output shaft.

The transmission includes a first sub-transmission for the first prime mover, including the first input shaft and a countershaft coupled to the first input shaft via a constant ratio. Gearwheels are arranged on the countershaft, which mesh exclusively into gearwheels arranged coaxially to the first input shaft. At least some of the gearwheels arranged coaxially to the first input shaft mesh into gearwheels arranged on the output shaft, and shift elements are associated with the first input shaft as well as with the countershaft, which, depending on their shift position, provide either a gear with a first number of instances of gearwheel meshing or a winding-path gear with a second, larger number of instances of gearwheel meshing for the first prime mover.

The transmission includes a second sub-transmission for the second prime mover, which includes the second input shaft. The second sub-transmission is designed as a planetary transmission with a sun gear, a ring gear, and a carrier. The ring gear of the planetary transmission forms the second input shaft of the second sub-transmission, and the carrier of the planetary transmission is coupled to the output shaft via a gearwheel arranged coaxially to the first input shaft. Shift elements are associated with the planetary transmission, via which, depending on their shift position, the sun gear is fixedly connectable to the housing or the planetary transmission is bringable into direct drive.

Moreover, the transmission includes a sub-transmission coupling between the first sub-transmission and the second sub-transmission, which is providable via one of the shift elements associated with the countershaft, wherein, for the case in which this shift element associated with the countershaft, via which the sub-transmission coupling is providable, is engaged, the ring gear of the planetary transmission is coupled to the countershaft and, via the countershaft, to the first input shaft.

In the transmission according to example aspects of the invention, the sub-transmission for the second prime mover is not designed as a spur gear drive, but rather as a planetary transmission.

The ring gear of the planetary transmission provides the input side and/or the input shaft of the planetary transmission. The output side of the planetary transmission is formed by the carrier, which is operatively connected to the output shaft. Depending on the shift position of the shift elements associated with the planetary transmission, the sun gear of the planetary transmission can be either fixedly connected to the housing or, in order to ensure a direct drive, coupled to another element of the planetary transmission, for example, to the ring gear thereof. Alternatively, the sun gear of the planetary transmission could also be connected to the carrier of the planetary transmission, however, for interlock.

In the transmission according to example aspects of the invention, the output shaft can be designed to be very short, with only two spur gear planes with respect to the gearwheels arranged coaxially to the first input shaft. As a result, installation space and weight of the transmission can be reduced.

According to one advantageous example refinement, a further shift element is associated with the planetary transmission, via which, depending on the shift position, a speed superimposition mode is settable for the first prime mover and the second prime mover at the planetary transmission, in which the first prime mover is coupled to the sun gear of the planetary transmission, the second prime mover is coupled to the ring gear of the planetary transmission, and the carrier of the planetary transmission is coupled to the output shaft.

Via the speed superimposition mode, an electrodynamic starting operation EDA mode for electrodynamic driving can be made available. In the EDA mode, the electric machine operatively connected to the second input shaft rotates in reverse and, thus, operates as a generator, and so the EDA mode can also be utilized for the case in which an electrical energy accumulator is not charged.

According to one advantageous example refinement, a third prime mover is present, which is designed as an electric machine, wherein the third prime mover is operatively connected to the first input shaft.

A particularly advantageous operation of the transmission is possible with the second electric machine and/or the third prime mover. Thus, the second electric machine and/or the third prime mover can operate as a start-generator and improve the functionality of a hybrid transmission system including the transmission. In addition, a serial operation is possible, in which the third prime mover, i.e., the second electric machine, generates electric current for the second prime mover, i.e., the first electric machine, in defined shift conditions of the transmission.

For the case in which the third prime mover is utilized in combination with a separating clutch between the first prime mover and the first input shaft, purely electric electronic-speed-sensor powershifts are providable.

BRIEF DESCRIPTION OF THE DRAWINGS

Exemplary embodiments of the invention are explained in greater detail with reference to the drawings, without being limited thereto, in which:

FIG. 2 shows a shift pattern of the transmission system from FIG. 1;

DETAILED DESCRIPTION

Figure 1:
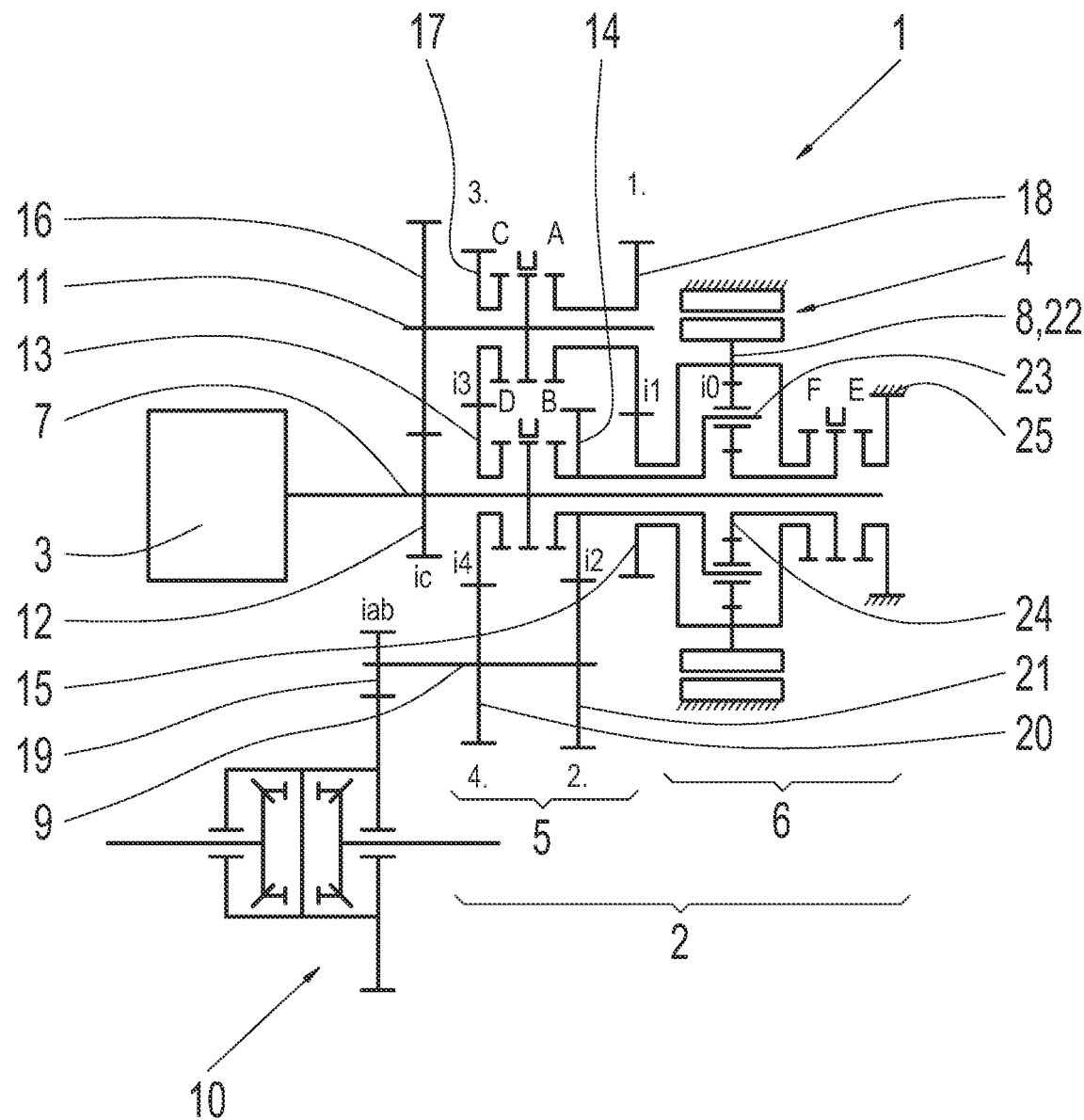
FIG. 1 shows a diagram of a transmission system of a motor vehicle with a first exemplary embodiment of a transmission.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic of a transmission system 1 of a motor vehicle according to example aspects of the invention, which includes a transmission 2 according to example aspects of the invention and two prime movers 3, 4, namely a first prime mover 3, preferably designed as an internal combustion engine, and a second prime mover 4, preferably designed as an electric machine.

Thus, the preferred exemplary embodiment is a hybrid transmission system with the internal combustion engine 3, the electric machine 4, and the transmission 2 according to example aspects of the invention.

The transmission 2 according to example aspects of the invention includes two sub-transmissions 5 and 6, namely a first sub-transmission 5 for the first prime mover 3, preferably designed as an internal combustion engine, wherein this first sub-transmission 5 includes a first input shaft 7, to which, in the exemplary embodiment from FIG. 1, the first prime mover 3 is permanently connected.

Moreover, the transmission 2 according to example aspects of the invention includes a second sub-transmission 6. The second sub-transmission 6 acts as a sub-transmission for the second prime mover 4, preferably designed as an electric machine, wherein the second sub-transmission 6 provides a second input shaft 8, to which, in FIG. 1, the second prime mover 4, designed as an electric machine, is permanently directly coupled.

In addition, the transmission 2 includes an output shaft 9, namely a single output shaft 9, to which a drive output 10 is coupled. As part of the drive output 10, a differential is schematically shown here.

The first sub-transmission 5 includes, in addition to the first input shaft 7 for the first prime mover 3, a countershaft 11. The countershaft 11 extends in parallel to the first input shaft 7.

Gearwheels 16, 17, and 18 are arranged and/or mounted on the countershaft 11. The gearwheel 16 of the countershaft 11 is a fixed gear, which is rotationally fixed to the countershaft 11. The gearwheels 17 and 18 of the countershaft 11 are idler gears.

The two shift elements A and C of the first sub-transmission 5 are associated with the countershaft 11 and preferably form a double shift element, and so only one of these shift elements A and C can ever be engaged at a time. For the case in which the shift element A is engaged, the idler gear 18 is connected to the countershaft 11 in a rotationally fixed manner. For the case in which the shift element C is engaged, however, the idler gear 17 is connected to the countershaft 11 in a rotationally fixed manner.

The gearwheels 16, 17, and 18 of the countershaft 11 mesh exclusively into gearwheels arranged coaxially to the first input shaft 7, namely into the gearwheels 12, 13, and 15. The gearwheel 12 is a fixed gear of the first input shaft 7, which meshes into the fixed gear 16 of the countershaft 11. As a result, a constant ratio is for the countershaft 11 is implemented.

The gearwheel 13, which is arranged coaxially to the first input shaft 7 and meshes into the idler gear 17 of the countershaft 11, is an idler gear of the first input shaft 7, which is coupled to the first input shaft 7 in a rotationally fixed manner for the case in which a shift element D of the first sub-transmission 5, which is associated with the first input shaft 7, is engaged.

A further idler gear 14, which is arranged coaxially to the first input shaft 7, is mounted on the first input shaft 7. This idler gear 14 is coupled to the input shaft 7 in a rotationally fixed manner for the case in which a further shift element B of the first sub-transmission 5, which is associated with the first input shaft 7, is engaged.

These two shift elements D and B associated with the first input shaft 7 are preferably designed as a double shift element, wherein only one of these shift elements D, B can ever be engaged at a time.

The idler gear 18 of the countershaft 11 meshes into the gearwheel 15. This gearwheel 15 is also positioned coaxially to the first input shaft 7.

Due to the fact that the gearwheels 16, 17, and 18 of the countershaft 11 mesh exclusively with gearwheels 12, 13, and 15, which are arranged coaxially to the first input shaft 7, and, thus, do not mesh with gearwheels of the output shaft 9, the countershaft 11 can be positioned relatively freely, as viewed in the circumferential direction, with respect to the first input shaft 7, namely for the case in which a geometric collision with other assemblies is avoided.

The output shaft 9 of the transmission 2 supports gearwheels 19, 20, and 21, which are all designed as fixed gears. The fixed gear 19 of the output shaft 9 meshes into the drive output 10, namely the differential of the drive output 10. The fixed gear 20 meshes into the idler gear 13 of the first input shaft 7. The fixed gear 21 meshes into the idler gear 14 of the first input shaft 7.

In addition to this first sub-transmission 5 for the first prime mover 3, which is preferably designed as an internal combustion engine, the transmission 2 includes the second sub-transmission 6 for the second prime mover 4, which is preferably designed as an electric machine.

This second sub-transmission 6 is designed as a planetary transmission and includes a ring gear 22, a carrier 23, and a sun gear 24. The carrier 23 provides the second input shaft 8 of the second sub-transmission 6, to which, in the exemplary embodiment from FIG. 1, the second prime mover 4 is directly and permanently connected. The output side of the second sub-transmission 6 is made available by the carrier 23, which is coupled to the idler gear 14 and, via the idler gear 14, to the fixed gear 21 of the output shaft 9.

Shift elements F and E are associated with the second sub-transmission 6, designed as a planetary transmission. Via the shift elements F and E, the sun gear 24 of the planetary transmission 6 can be either fixedly connected to a housing 25 or coupled to another element of the planetary transmission in such a way that the planetary transmission is in direct drive.

For the case in which the shift element E is engaged, the sun gear 24 of the second sub-transmission 6, designed as a planetary transmission, is fixedly connected to the housing. However, for the case in which the shift element F is engaged, the planetary transmission 6 is in direct drive, specifically due to the fact that the sun gear 24 in FIG. 1 is connected to the ring gear 22.

In contrast, it would also be possible to make the direct drive available for the second sub-transmission 6, designed as a planetary transmission, in that the sun gear 24 is connected to the carrier 23.

As mentioned above, the first sub-transmission 5 acts as a sub-transmission for the first prime mover 3, which is preferably designed as an internal combustion engine. Depending on the shift position of the shift elements A, B, C, or D, the first sub-transmission 5 provides either a conventional gear with a first number of instances of gearwheel meshing, namely with two instances of gearwheel meshing, or a winding-path gear with a second, larger number of instances of gearwheel meshing, namely with four instances of gearwheel meshing, for the first prime mover 3.

The Gear VM1 and the Gear VM3 in the shift pattern from FIG. 2 are these types of winding-path gears, in which one of the shift elements C or A associated with the countershaft 11 is engaged.

The conventional gears with the smaller number of instances of gearwheel meshing are the gears VM2 and VM4 in the shift pattern from FIG. 2. In the conventional gears, the shift elements C and A are disengaged.

The two sub-transmissions 5, 6 of the transmission 2 are coupleable to each other via a sub-transmission coupling. This sub-transmission coupling is made available by the shift element A associated with the countershaft 11. For the case in which the shift element A is engaged, the first prime mover 3, which is preferably designed as an internal combustion engine, and the second prime mover 4, which is preferably designed as an electric machine, are in a fixed speed ratio. Thus, the first prime mover 3 can utilize the gears of the second sub-transmission 6 and the second prime mover 4 can utilize the gears of the first sub-transmission 5. In this way, in particular, in the condition 1 in the shift pattern from FIG. 1, the first gear of the internal combustion engine 3 shares the first gear of the electric machine EM1, which corresponds to the second prime mover 4 from FIG. 1.

The shift pattern from FIG. 2 summarizes the implementable shift conditions, gears, and ratios of the transmission 2 from FIG. 1. Particular engaged shift elements are marked with an X. Travel can take place purely electrically via the second prime mover 4—the electric machine EM—or in a purely internal combustion engine-driven manner via the first prime mover 3—the internal combustion engine VM—or in a hybrid manner with a contribution from both prime movers 3, 4. The ratio values in the shift pattern from FIG. 2 are merely examples.

Moreover, an electrical energy accumulator (not shown) can be charged in neutral.

Due to the fact that the second sub-transmission 6 is designed as a planetary transmission, the output shaft 9 can be designed to be relatively short and includes only two fixed gears 20, 21 meshing with the idler gears 13, 14 of the first input shaft 7. As a result, installation space and weight can be saved. For the case in which the shift elements F and E are designed as a double shift element, which is arranged at the end of the first input shaft 7, the installation space can be further reduced. A further reduction of installation space is possible when, as in FIG. 1, the electric machine or the second prime mover 4 is coaxially designed, since the planetary gear set of the planetary transmission can then be arranged nested in the rotor of the electric machine 4.

Figure 3:
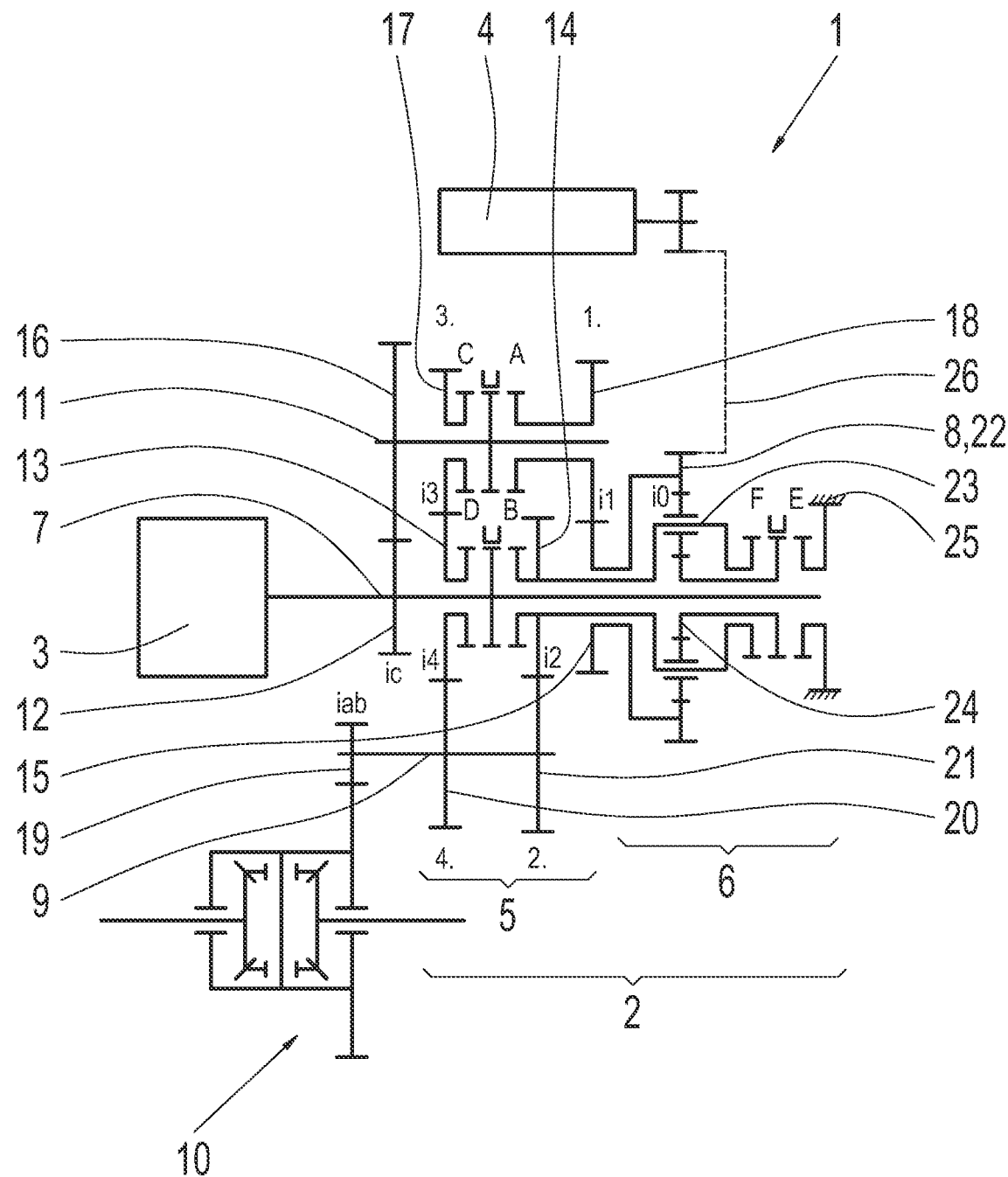
FIG. 3 shows a diagram of a transmission system of a motor vehicle with a second exemplary embodiment of a transmission.

FIG. 3 shows an example modification of the transmission 2 from FIG. 1, wherein the exemplary embodiment from FIG. 3 differs from the exemplary embodiment from FIG. 1 only in that the second prime mover 4, preferably designed as an electric machine, is not arranged coaxially, but rather axially parallel. The second prime mover 4, designed as an electric machine, is connected to the ring gear 22 of the planetary gear set of the second sub-transmission 6 set via at least one spur gear stage 26. Alternatively, the second prime mover 4 can be connected via a chain to the ring gear 22, which provides the second input shaft 8. A pre-ratio can also be connected, via a further planetary gear stage, between the ring gear 22 and the second prime mover 4. The exemplary embodiment from FIG. 3 also differs from the exemplary embodiment from FIG. 1, in that, when the shift element F is engaged, the sun gear 24 is interlocked with the carrier 23 and not with the ring gear 22. A direct drive for the planetary transmission can also be implemented in FIG. 3 when the shift element F is engaged.

Figure 4:
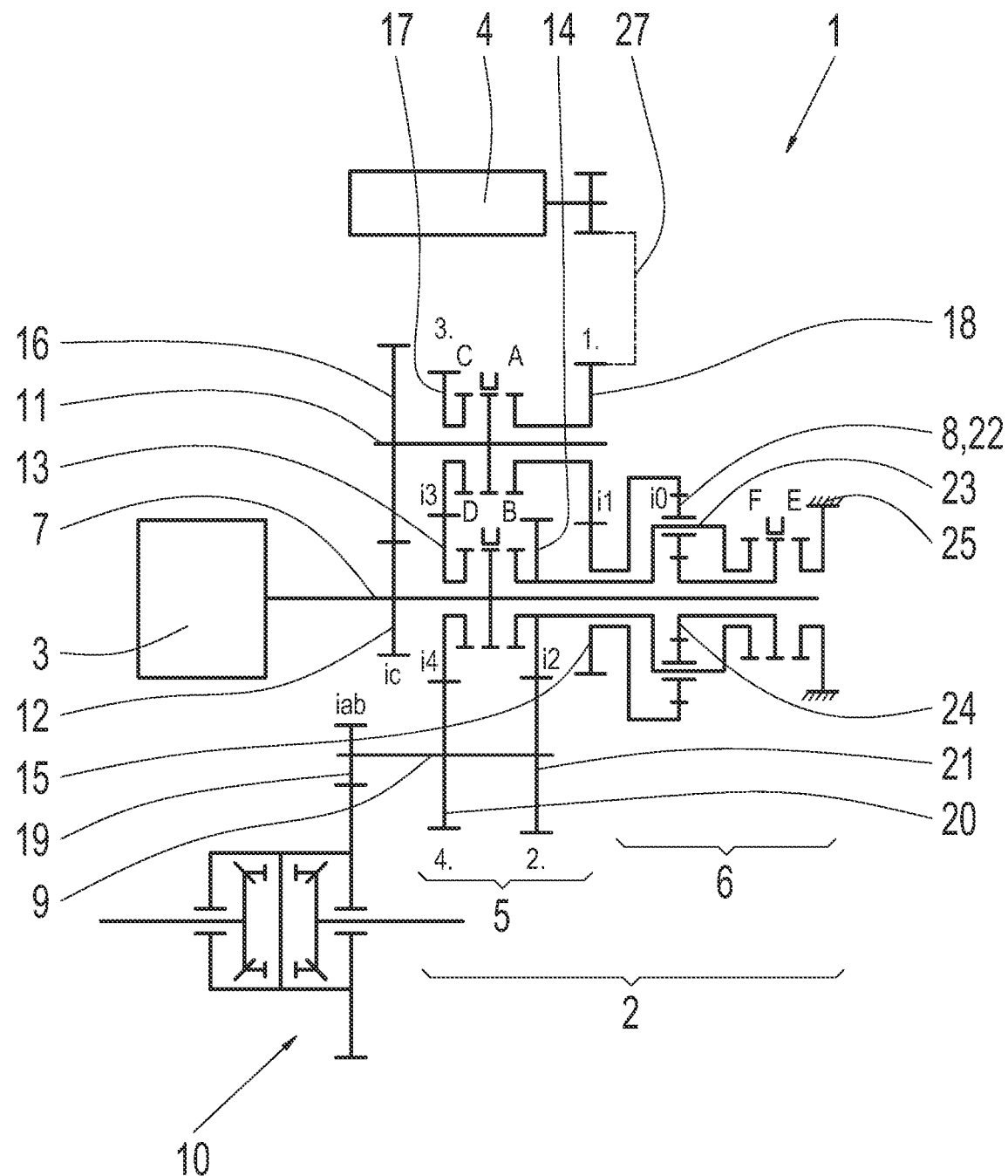
FIG. 4 shows a diagram of a transmission system of a motor vehicle with a third exemplary embodiment of a transmission.

FIG. 4 shows a further example modification of the transmission 2 from FIG. 1, wherein, in FIG. 4, the second prime mover 4, preferably designed as an electric machine, is connected to the idler gear 18 of the countershaft 11 via at least one spur gear stage 27 or also via a chain and, thus, is indirectly coupled to the ring gear 22 via the idler gear 18 of the countershaft 11 and, thereby, is indirectly operatively connected to the second input shaft 8 of the second sub-transmission 6. In the example embodiment from FIG. 4, similarly to the exemplary embodiment from FIG. 3, for the case in which the shift element F is engaged, the sun gear 24 is coupled to the carrier 23, in order to provide, in this way, a direct drive for the planetary transmission of the second sub-transmission 6.

It is pointed out here that, in the exemplary embodiments from FIGS. 1, 3, and 4, similarly to the example embodiment from FIG. 7 described further below, the first input shaft 7 does not need to extend to the end of the transmission 2. Instead, the first input shaft 7, as viewed from the first prime mover 3, can also extend only up to the shift element B.

Figure 5:
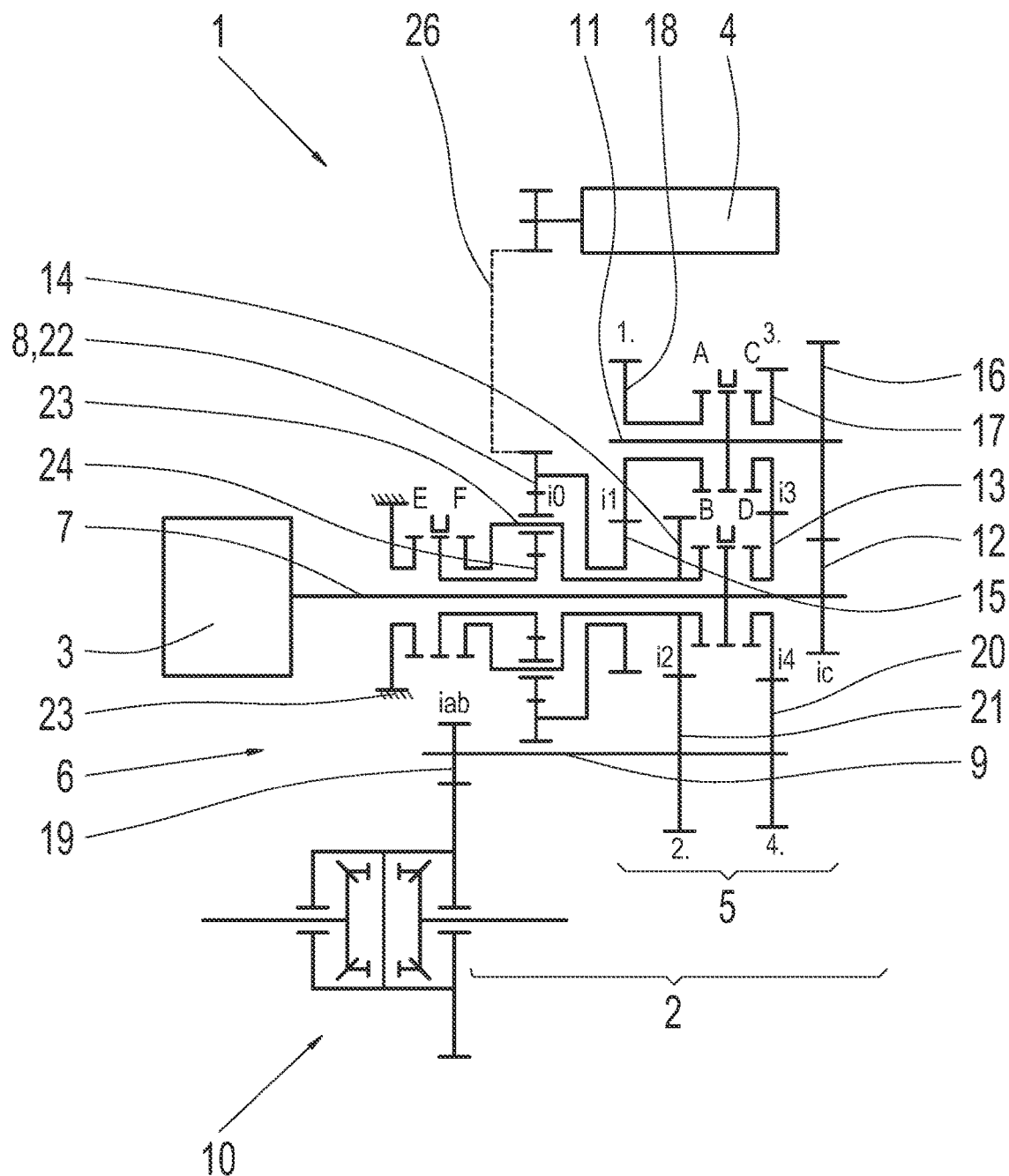
FIG. 5 shows a diagram of a transmission system of a motor vehicle with a fourth exemplary embodiment of a transmission.

FIG. 5 shows an example embodiment of the invention, in which the transmission 2 is designed as a mirror image and/or the first prime mover 3, which is preferably designed as an internal combustion engine, is connected to the first input shaft 7 at the opposite side of the transmission 2 as compared to the exemplary embodiments from FIGS. 1, 3, and 4.

Figure 6:
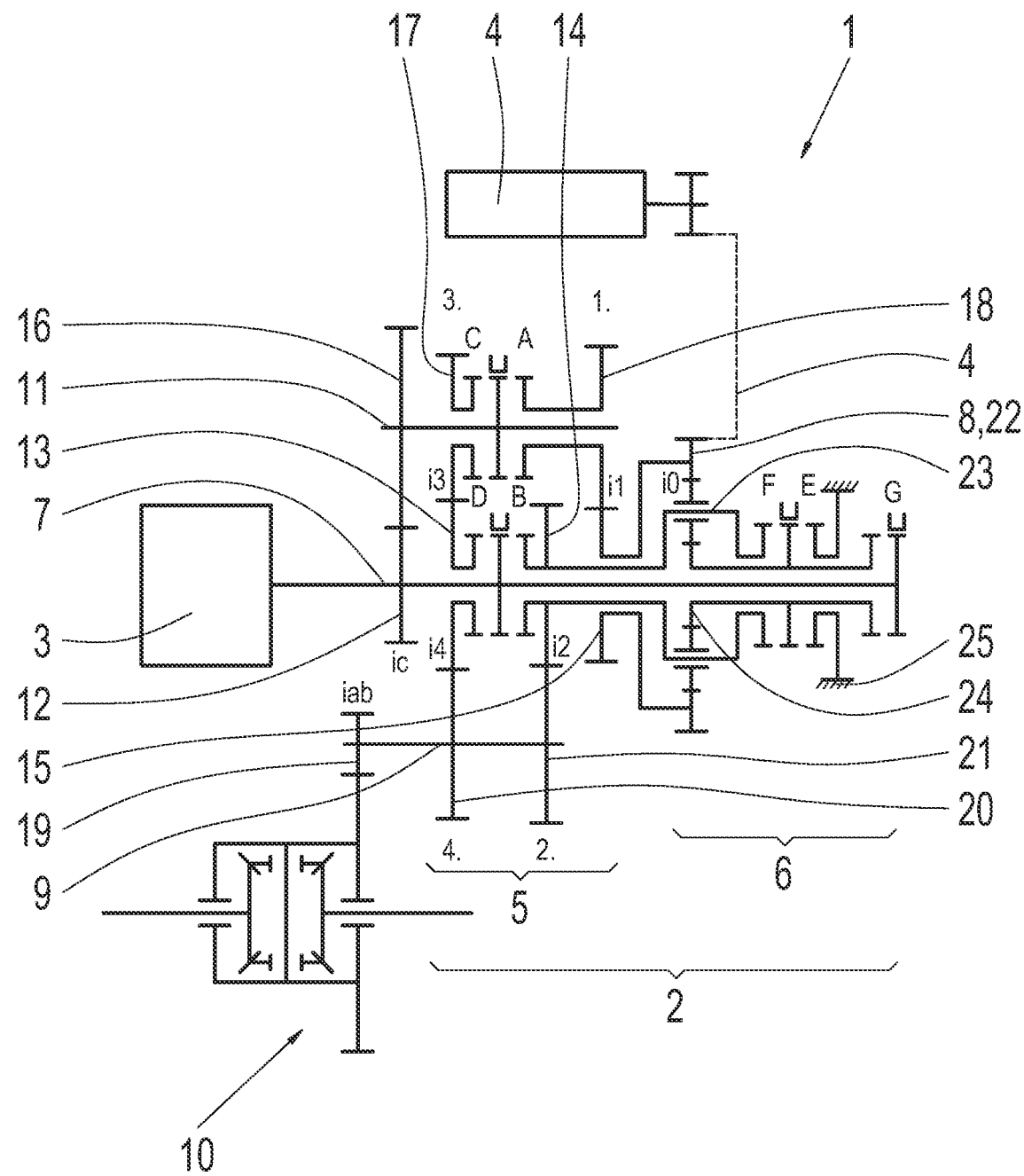
FIG. 6 shows a diagram of a transmission system of a motor vehicle with a fifth exemplary embodiment of a transmission.

FIG. 6 shows an example embodiment of the invention, which is based on the example embodiment from FIG. 3 and includes a further shift element G, which is associated with the second sub-transmission 6. For the case in which only this further shift element G is engaged and all other shift elements A, B, C, D, E, and F are disengaged, an EDA operating mode and/or speed superimposition mode exists for the first prime mover 3 and the second prime mover 4 at the planetary transmission 6. The first prime mover 3, designed as an internal combustion engine, is connected to the sun gear 24 of the planetary transmission when the shift element G is engaged. The second prime mover 4, designed as an electric machine, is operatively connected to the ring gear 22 of the planetary transmission. The carrier 23 functions as drive output. In the numerical example from FIG. 2, the torque ratio of the prime mover 3, which is preferably designed as an internal combustion engine, with respect to the drive output, namely with respect to the differential, is 14.9 and is higher than the first gear. Due to the EDA operating mode provided when the shift element G is engaged and all other shift elements are disengaged, the overall gear ratio of the transmission 2 can therefore be expanded. The torque ratio for the second prime mover 4, which is designed as an electric machine, is 8.63 in the numerical example from FIG. 2 and corresponds to the first gear for the second prime mover 4.

In the EDA operating mode, a starting operation can be carried out when the energy accumulator is dead, since the second prime mover 4, designed as an electric machine, rotates in reverse and, therefore, operates as a generator when the vehicle is at a standstill.

Figure 7:
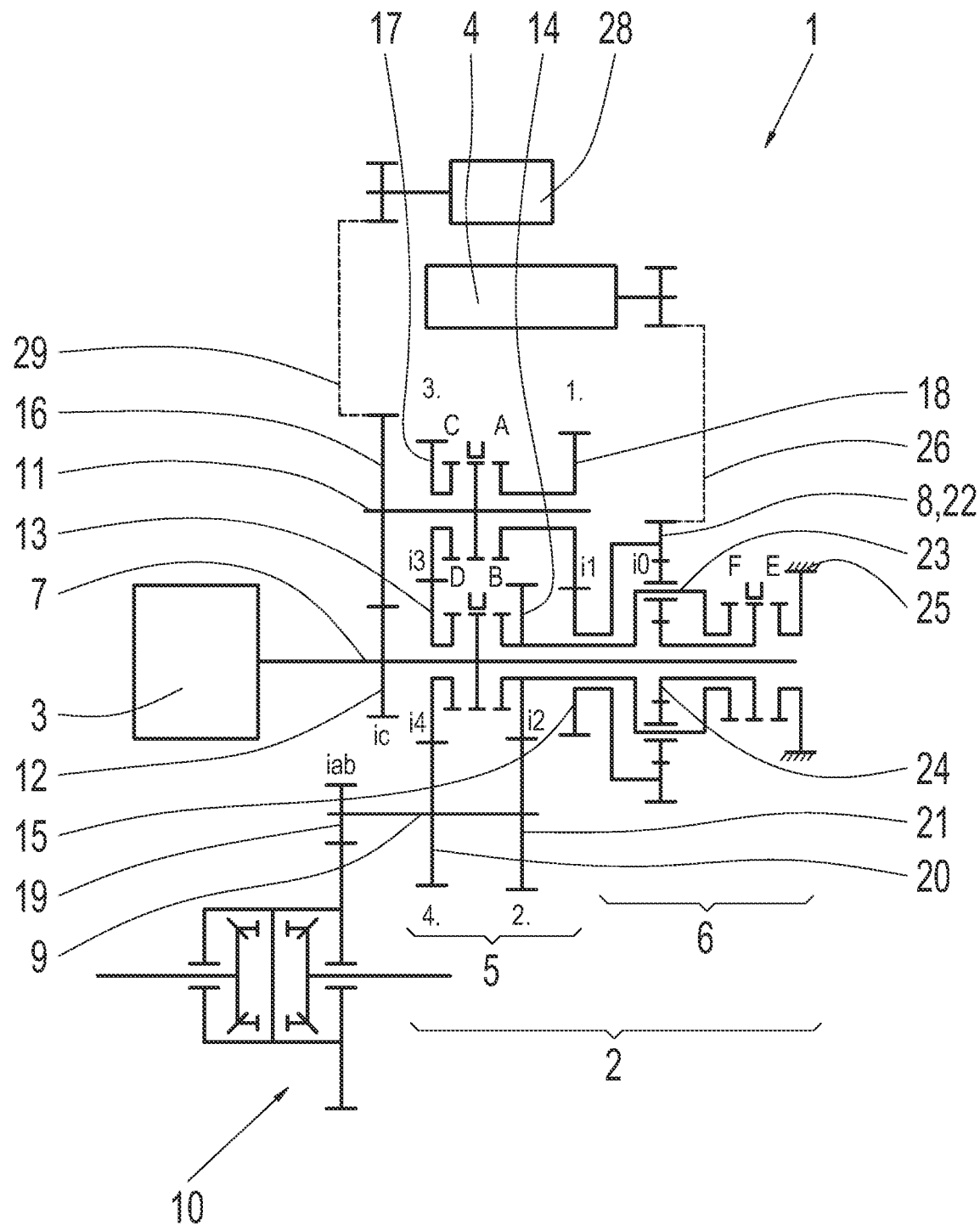
FIG. 7 shows a diagram of a transmission system of a motor vehicle with a sixth exemplary embodiment of a transmission.

In the exemplary embodiment from FIG. 7, which is also based on the exemplary embodiment from FIG. 3, a third prime mover 28 is present, which, similarly to the second prime mover 4, is designed as an electric machine.

This third prime mover 28, designed as an electric machine, is connected, in FIG. 7, via one or multiple spur gear stage(s) 29 to the countershaft 11, namely to the fixed gear 16 of the countershaft 11, which is engaged with the fixed gear 12 of the first input shaft 7. Since the countershaft 11 has a fixed speed ratio with respect to the first input shaft 7 via the constant gear stage ic, the third prime mover 28 can be connected, advantageously, to the fixed gear 16 of the countershaft 11. A further planetary gear set, as a pre-ratio, is also possible directly at the rotor of the third prime mover 28.

Alternatively, the third prime mover 28 can also be directly connected to the fixed gear 12 of the first input shaft 7. Moreover, the third prime mover 28 can be connected via a chain. For this purpose, an additional fixed gear would be necessary on the first input shaft 7 or the countershaft 11, at which the chain can engage. In addition, the third prime mover 28, which is a further electric machine, can also be arranged coaxially to the first input shaft 7, and, in fact, at either end of the transmission 2, i.e., either adjacent to the first prime mover 3, designed as an internal combustion engine, or at the opposite end adjacent to the second sub-transmission 6. A combination of two coaxial electric machines 4 and 28, similarly to the variant from FIG. 1, is also possible.

The third prime mover 28, designed as an electric machine, can operate as a starter-generator and, in this way, improve the function of the transmission system. Moreover, a serial operation is possible, in which the third prime mover 28 generates electric current for the second prime mover 4, and, in fact, in the shift conditions 10 and 11 in the shift pattern from FIG. 2.

Figure 8:
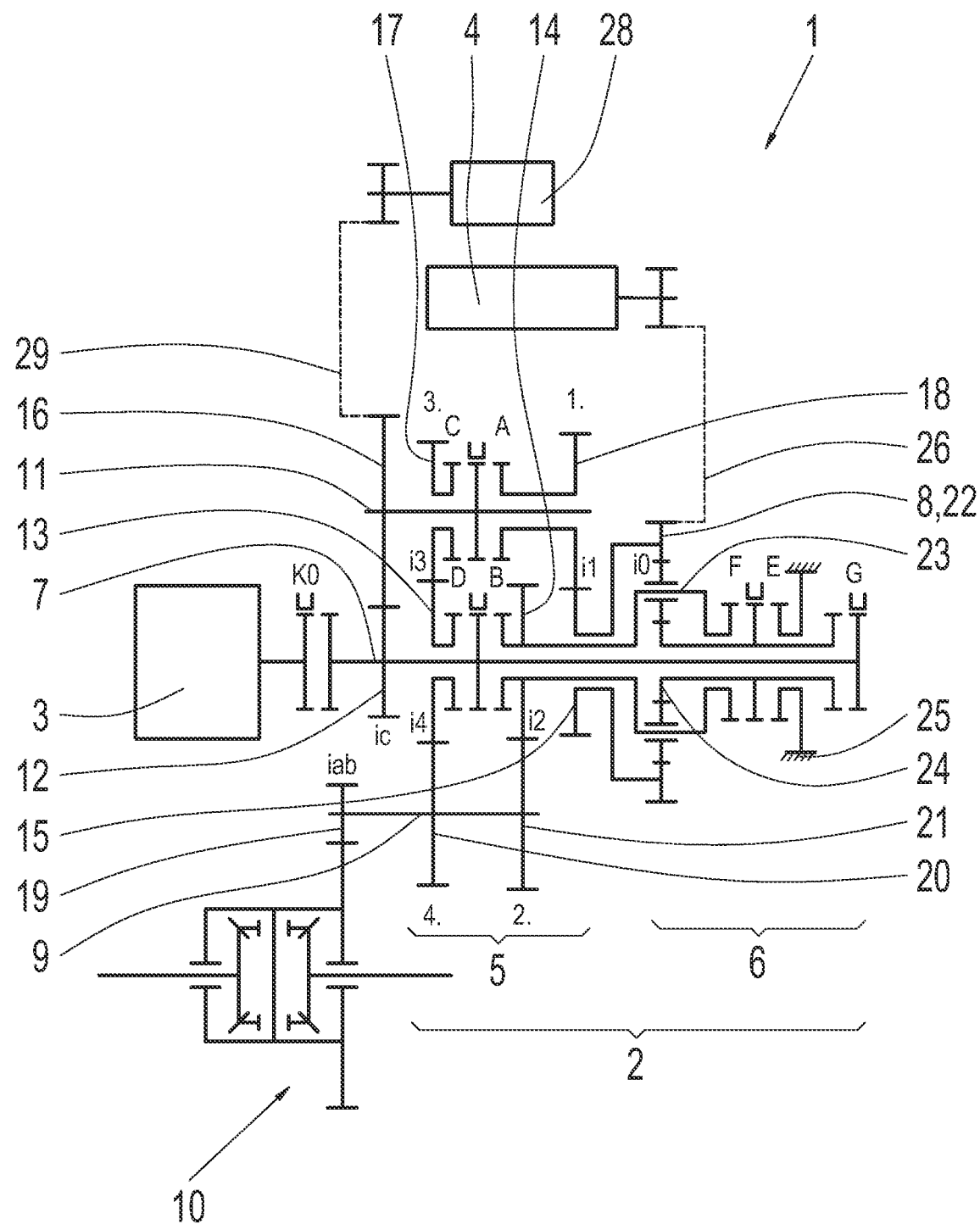
FIG. 8 shows a diagram of a transmission system of a motor vehicle with a seventh exemplary embodiment of a transmission.

FIG. 8 shows a further example development of FIG. 7, in which the further shift element G is present. The example variant from FIG. 8 therefore corresponds, for all intents and purposes, to the example variants from FIGS. 6 and 7, wherein a separating clutch K0 is additionally present, which is connected between the first input shaft 7 and the first prime mover 3, designed as an internal combustion engine.

This separating clutch K0 is a form-locking separating clutch in the exemplary embodiment from FIG. 8.

For the case in which the separating clutch K0 is engaged or, alternatively, not present, a power-split operation can be made available. For the case in which, in FIG. 8, the separating clutch K0 is engaged and, in addition, only the further shift element G is engaged and all further shift elements A, B, C, D, E, and F are disengaged, a power-split operation can be made available, in which all three prime movers 3, 4, and 28 cooperate. This operation can be utilized for the starting operation when the electrical energy accumulator is depleted or dead, even up to higher speeds. A changeover into the gears VM2, VM3, and VM4 of the shift matrix from FIG. 2 is possible when one of the shift elements B, C, or D is engaged.

For the case in which, in FIG. 8, the separating clutch K0 is disengaged, travel can take place purely electrically. In this case, the third prime mover 28 replaces the first prime mover 3. The third prime mover 28, designed as an electric machine, can then utilize the gears of the first sub-transmission 5. Shift conditions provided with the remark "hybrid drive" in the table from FIG. 2 for the exemplary embodiment from FIG. 1 mean, in FIG. 8, an operation with both electric machines 4 and 28. The information for the internal combustion engine then applies for the third prime mover, i.e., the electric machine 28.

In the exemplary embodiment from FIG. 8, when the separating clutch K0 is disengaged, a purely electric powershift, a electronic speed sensor powershift, is possible. Starting from the shift condition 10 from FIG. 2, in which the second prime mover 4, designed as an electric machine, utilizes the first electric motor-operated gear, it is possible to enter the shift condition 11 in the shift pattern from FIG. 2 without an interruption of tractive force. For this purpose, the third prime mover 28, designed as an electric machine, is coupled to the sun gear 24 of the planetary transmission 6 via the further shift element G and takes over a supporting torque for the shift element E. The shift element E is subsequently disengaged. Thereafter, the shift element F is synchronized and engaged.

In this case, it is advantageous that the third prime mover 28, designed as an electric machine, needs considerably less supporting torque and power at the sun gear 24 than the second prime mover 4, designed as an electric machine, at the ring gear 22. As a result, the third prime mover 28 can be implemented by a comparatively small and low-cost electric machine.

When the separating clutch K0 is disengaged, a starting operation can also take place purely electrically in a EDA mode. For the case in which only the shift element G is engaged and all other shift elements are disengaged, a speed superimposition mode exists between the two electric machines, which are made available by the prime movers 4 and 28, at the planetary transmission 6. In this way, a starting operation can take place purely electrically, wherein both electric machines 4 and 28 can also rotate when the vehicle is stationary. As a result, a standstill derating can be prevented at the electric machines 4, 28.

It is possible to actuate the separating clutch K0 and the further shift element G via a common actuator, and so only one of the shift elements K0 or G can ever be engaged at a time, but never both simultaneously. As a result, an actuator can be saved. It is disadvantageous in this case, however, that a power-split operation is not possible when the separating clutch K0 is engaged, since separating clutch K0 and the shift element G can not be simultaneously engaged. A serial operation is possible when the electrical energy accumulator is dead, however.

Figure 9:
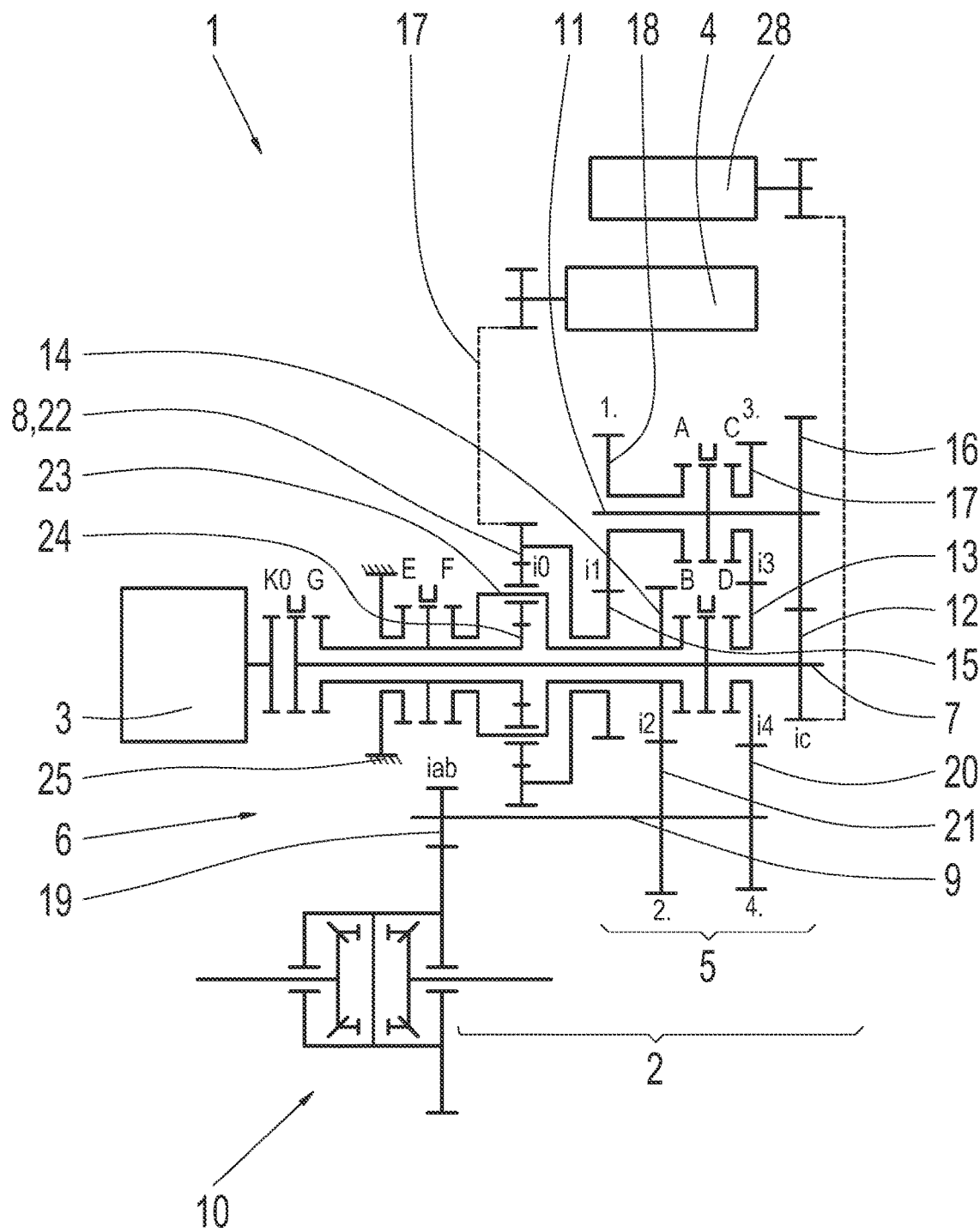
FIG. 9 shows a diagram of a transmission system of a motor vehicle with an eighth exemplary embodiment of a transmission.

FIG. 9 shows an example embodiment, in which the clutch K0 and the further shift element G are designed as a double shift element and are actuatable via a common actuator. The transmission 2 of the exemplary embodiment from FIG. 9 is designed as a mirror image as compared to the transmission 2 from FIG. 8, i.e., the internal combustion engine 3 is connected at the other side of the transmission 2. A further difference between the exemplary embodiment from FIG. 8 and the exemplary embodiment from FIG. 9 is that, in FIG. 9, the third prime mover 28 is connected via at least one spur gear stage 29 to the fixed gear 12 of the first input shaft 7 and not to the fixed gear 16 of the countershaft 11, as in FIG. 8.

Figure 10:
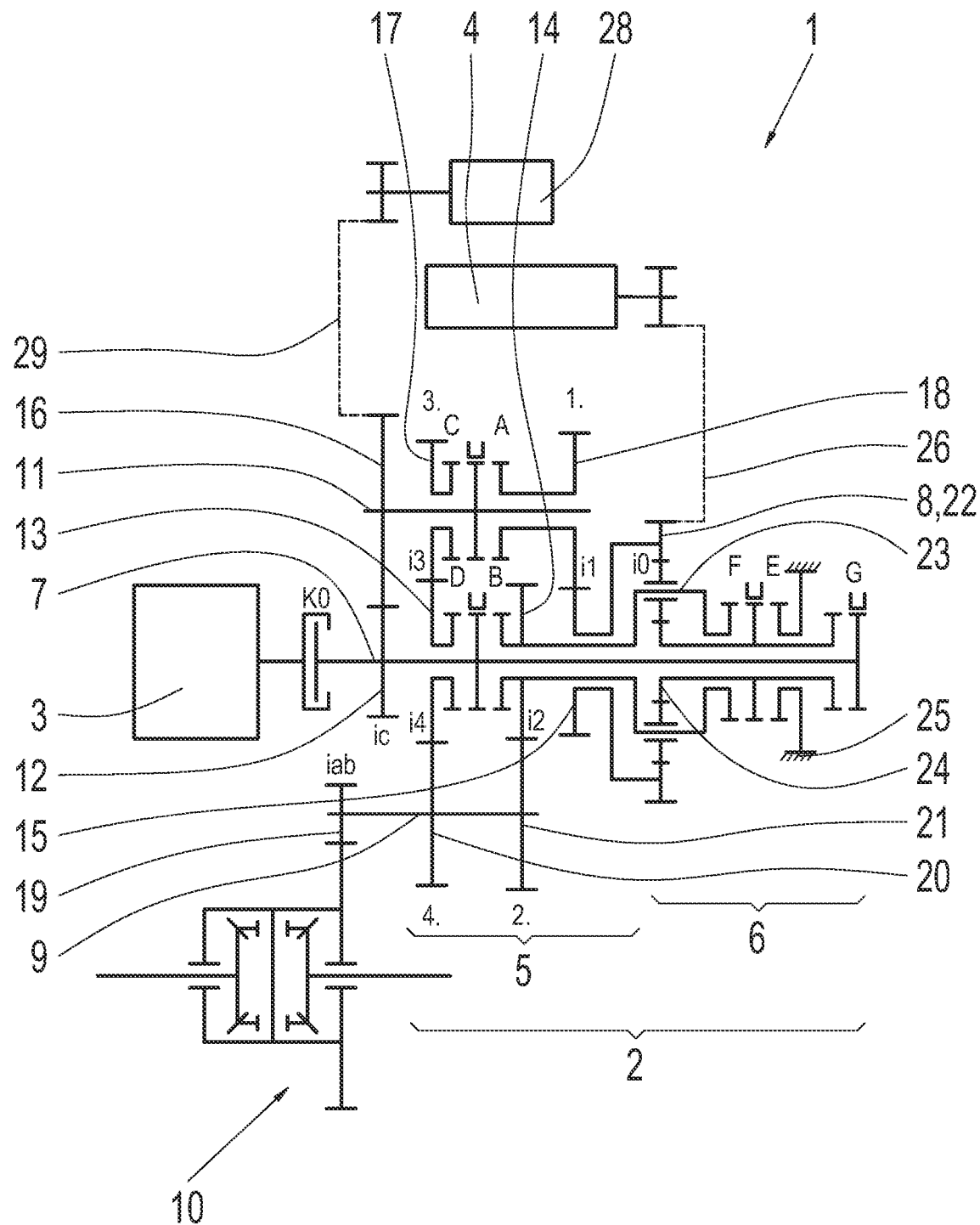
FIG. 10 shows a diagram of a transmission system of a motor vehicle with a further exemplary embodiment of a transmission.

FIG. 10 shows one further example embodiment variant of the invention, which differs from the example embodiment from FIG. 8 in that the separating clutch K0 is not designed as a form-locking clutch, but rather as a friction clutch. The utilization of a friction-locking separating clutch K0 is advantageous, since a friction-locking separating clutch K0 can also be disengaged under load, and so stall protection can be made available for the first prime mover 3, which is designed as an internal combustion engine. This means that the separating clutch K0 can be disengaged during an emergency braking, in order to prevent the first prime mover 3, which is designed as an internal combustion engine, from undesirably coming to a standstill.

The example variants shown in FIGS. 1 through 10 can be arbitrarily combined with one another. For example, in each exemplary embodiment, in which the separating clutch K0 is shown as a form-locking dog clutch, a friction-locking separating clutch K0 can be utilized. All example variants can be implemented with and without a separating clutch. All example variants can be implemented with and without a shift element G. In all example variants, the second prime mover 4, which is designed as an electric machine, can be designed coaxially or axially in parallel. All example variants can utilize or also not utilize the third prime mover 28, which is designed as a further electric machine. The electric machines 4, 28 can preferably be integral assemblies of the transmission 2.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 transmission system
2 transmission
3 first prime mover/internal combustion engine
4 second prime mover/electric machine
5 first sub-transmission
6 second sub-transmission
7 first input shaft
8 second input shaft
9 output shaft
10 drive output
11 countershaft
12 fixed gear
13 idler gear
14 idler gear
15 idler gear
16 fixed gear
17 idler gear
18 idler gear
19 fixed gear
20 fixed gear
21 fixed gear
22 ring gear
23 carrier
24 sun gear
25 housing
26 spur gear stage
27 spur gear stage
28 third prime mover/electric machine
29 spur gear stage
A shift element
B shift element
C shift element
D shift element
E shift element
F shift element
G shift element
K0 separating clutch

The invention claimed is:

1. A transmission (2) of a motor vehicle, comprising:
 a first input shaft (7) for a first prime mover (3);
 a second input shaft (8) for a second prime mover (4);
 an output shaft (9);
 a first sub-transmission (5) for the first prime mover (3), the first sub-transmission (5) comprising the first input shaft (7) and a countershaft (11) coupled to the first input shaft (7) via a constant ratio;
 a plurality of gearwheels (16, 17, 18) arranged on the countershaft (11) and meshing exclusively with a plurality of gearwheels (12, 13, 15) arranged coaxially to the first input shaft (7), one or more of the gearwheels (14, 15) arranged coaxially to the first input shaft (7) meshing with a plurality of gearwheels (20, 21) arranged on the output shaft (9);
 a plurality of shift elements (A, B, C, D) associated with the first input shaft (7) and the countershaft (11), the plurality of shift elements (A, B, C, D) associated with the first input shaft (7) and the countershaft (11), depending on shift position, configured for providing the first prime mover (3) either a gear with a first number of meshed gearwheels or a winding-path gear with a second, larger number of meshed gearwheels;

a second sub-transmission (6) comprising the second input shaft (8) for the second prime mover (4), the second sub-transmission (6) configured as a planetary transmission with a sun gear (24), a ring gear (22), and a carrier (23), the ring gear (22) forming the second input shaft (8) of the second sub-transmission (6), the carrier (23) coupled to the output shaft (9) via a gearwheel (14) arranged coaxially to the first input shaft (7);

a plurality of shift elements (F, E) associated with the planetary transmission and configured to selectively, depending on their shift position, fix the sun gear (24) to a housing or bring the planetary transmission into direct drive; and a sub-transmission coupling between the first sub-transmission (5) and the second sub-transmission (6), the sub-transmission coupling provided by one of the shift elements (A) associated with the countershaft (11), wherein, when the one of the shift elements (A) associated with the countershaft (11) is engaged, the ring gear (22) of the planetary transmission is coupled to the countershaft (11) and to the first input shaft (7) via the countershaft (11).

2. The transmission of claim 1, wherein the second prime mover (4) is directly coupleable to the second input shaft (8) of the second sub-transmission (6) such that the second prime mover (4) is directly operatively connected to the second input shaft (8) of the second sub-transmission (6).

3. The transmission of claim 1, wherein the second prime mover (4) is indirectly coupleable to the second input shaft (8) of the second sub-transmission (6) such that the second prime mover (4) is indirectly operatively connected to the second input shaft (8) of the second sub-transmission (6).

4. The transmission of claim 1, further comprising an additional shift element (G) is associated with the planetary transmission, via which, depending on shift position, a speed superimposition mode is settable for the first prime mover (3) and the second prime mover (4) at the planetary transmission, wherein the first prime mover (3) is coupled to the sun gear (24) of the planetary transmission, the second prime mover (4) is coupled to the ring gear (22) of the planetary transmission, and the carrier (23) of the planetary transmission is operatively connected to the output shaft (9) in the speed superimposition mode.

5. The transmission of claim 1, further comprising a third prime mover (28) configured as an electric machine, the third prime mover (28) operatively connected to the first input shaft (7).

6. The transmission of claim 5, wherein the third prime mover (28) is coupled either to a fixed gear (12) arranged on the first input shaft (7) or to a fixed gear (16) arranged on the countershaft (11).

7. The transmission of claim 1, wherein a fixed gear (12) arranged on the first input shaft meshes with a fixed gear (16) arranged on the countershaft in order to provide the constant ratio between the first input shaft (7) and the countershaft (11).

8. The transmission of claim 7, further comprising a third prime mover (28) coupled either to the fixed gear (12) arranged on the first input shaft (7) or to the fixed gear (16) arranged on the countershaft (11).

9. The transmission of claim 1, further comprising a separating clutch (KO) associated with the first input shaft (7) for the selectively connecting the first prime mover (3) to the first input shaft (7).

10. The transmission of claim 9, wherein the separating clutch (KO) is a form-locking separating clutch or a friction-locking separating clutch.

11. A transmission system of a motor vehicle, comprising:
the transmission (2) of claim 1;
the first prime mover (3) coupled to the first input shaft (7);
the second prime mover (4) coupled to the second input shaft (8); and
a drive output (10) coupled to the output shaft (9).

* * * * *